UNITED STATES PATENT OFFICE.

JACOB J. DETWILLER, OF GREENVILLE, NEW JERSEY.

INSECTICIDE-PASTILLE.

SPECIFICATION forming part of Letters Patent No. 232,695, dated September 28, 1880.

Application filed March 5, 1878.

*To all whom it may concern:*

Be it known that I, JACOB J. DETWILLER, of Greenville, Hudson county, State of New Jersey, have invented a new and useful Process for Disabling or Driving Away Mosquitoes, Flies, and other Insects, of which the following is a complete specification.

I take twenty-four parts, by weight, of the blossoms of *Pyrethrum carneum*, and *Cineraria folium* in their natural or powdered state, and mix them with four parts carbon, one part nitrate of potash, half-part gum-benzoin, and one-sixteenth part of gum-tragacanth. The ingredients are then moistened slightly with water and formed by pressure into cylindrical or any other convenient form of pastilles. When dry the pastilles are ready for use. The ignition of these pastilles will disengage such fumes and gases, which, when acting upon mosquitoes and other insects in a closed room, will render them harmless or cause their destruction.

I claim—

A composition of matter composed of the flowers of *Pyrethrum carneum*, charcoal, saltpeter, and gum pressed into a pastille, as above set forth.

JACOB J. DETWILLER.

Witnesses:
 JACOB WEART,
 GEO. WHITEFORD.